A. L. KIRKWOOD.
GUMMING AND FILING MACHINE.
APPLICATION FILED SEPT. 18, 1911.

1,065,877.

Patented June 24, 1913.

WITNESSES

INVENTOR
Abraham L. Kirkwood
BY
ATTORNEYS

UNITED STATES PATENT OFFICE.

ABRAHAM L. KIRKWOOD, OF CADDO GAP, ARKANSAS.

GUMMING AND FILING MACHINE.

1,065,877.   Specification of Letters Patent.   Patented June 24, 1913.

Application filed September 18, 1911.   Serial No. 649,812.

*To all whom it may concern:*

Be it known that I, ABRAHAM L. KIRKWOOD, a citizen of the United States, and a resident of Caddo Gap, in the county of Montgomery and State of Arkansas, have invented a new and Improved Gumming and Filing Machine, of which the following is a full, clear, and exact description.

My invention comprehends a saw gumming and filing machine and the object of my invention is to provide a construction having the following characteristics: A suitable frame is provided with means for holding a circular saw in position thereon, there being an emery or other sharpening wheel revolubly and adjustably mounted on the frame, the construction and arrangement being such that the wheel when revolving will engage in one of the teeth of the saw only at or above a certain speed; other means are provided for moving the saw in order to bring each tooth into successive engagement with the sharpening wheel, there being an automatic vise or clamp for holding the saw in such successive position; other means are provided for dressing the sides of each tooth after the sharpening wheel has done its work, all of the above means collectively forming a unitary machine which may be driven by any suitable power and which when once set in motion requires no further personal attention.

Other objects and advantages of the invention will appear as the description of the machine proceeds, the new and novel features being set forth and included within the appended claims.

Reference is to be had to the accompanying drawings forming a part of this specification, in which similar characters of reference denote corresponding parts in all the views, and in which—

Figure 1:
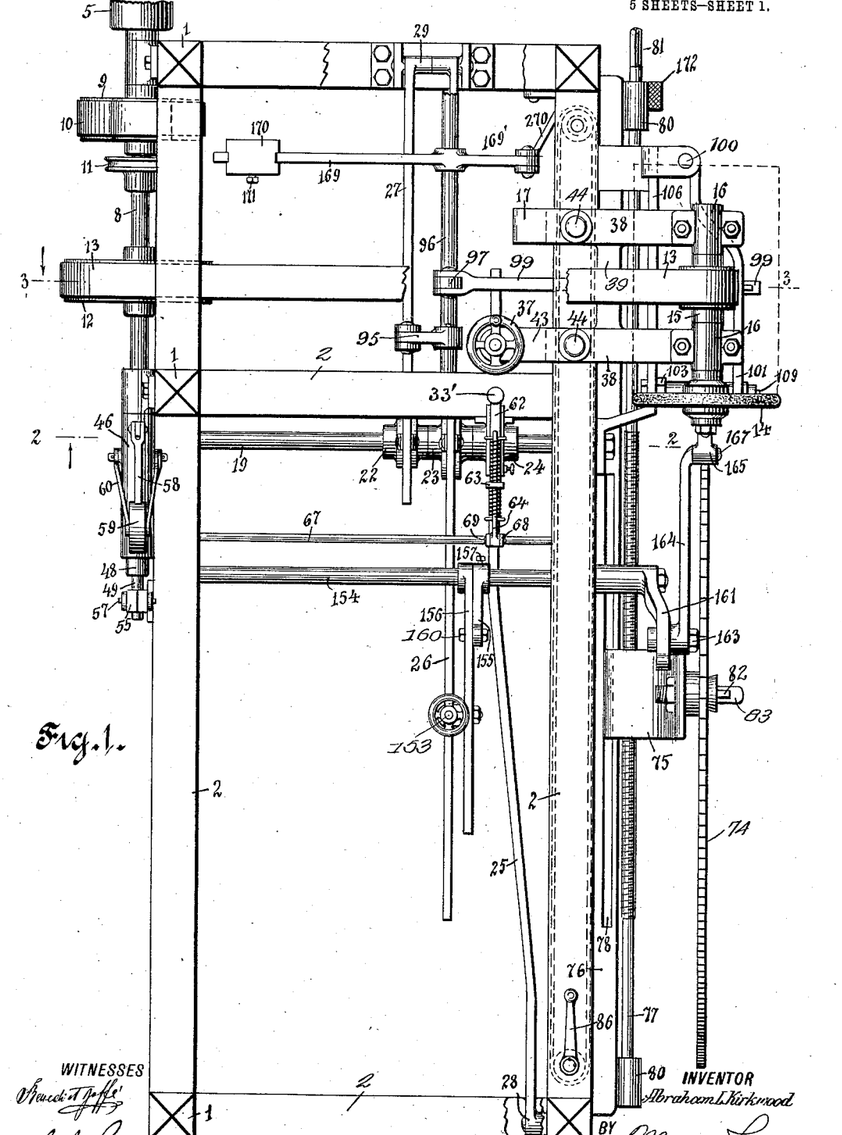
Figure 1 is a top plan view of the machine, the wheels used for dressing each tooth after filing being omitted for the sake of clearness, the location of this means being indicated in dotted lines.
Figures 2, 9:
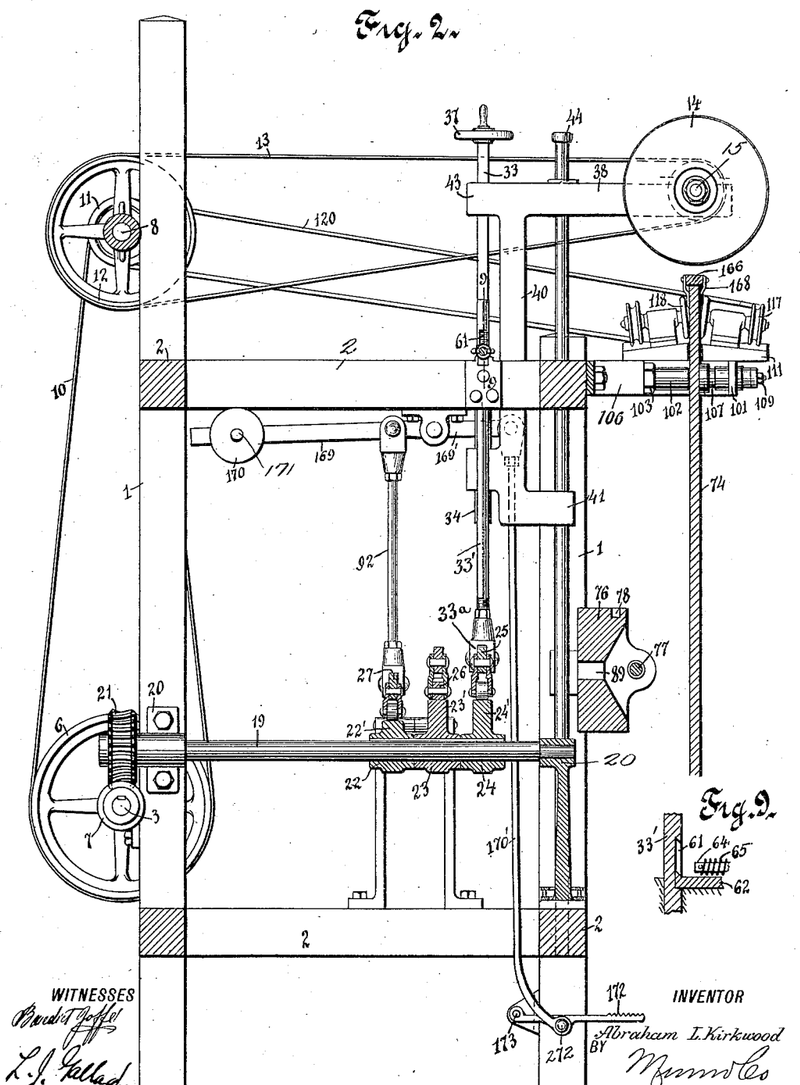
Fig. 2 is a vertical sectional view of the machine along the line 2—2 of Fig. 1.
Fig. 9 is a partial vertical sectional view on the line 9—9 of Fig. 2 showing the locking means for maintaining the sharpening wheel in elevated position until a certain speed is reached.

The machine comprises a frame of any suitable or desirable outline, preferably of the configuration shown in Figs. 1 and 2, there being a number of uprights 1, located at different corners and intermediate of the ends, the uprights being connected together by a plurality of horizontal members 2 in order to form a rigid structure. Suitably secured adjacent one end of the frame is a shaft 3 mounted in bearings 4, one end of the shaft being provided with a driving pulley 5, there being another pulley 6 intermediate of the ends, the inner end of the shaft being provided with a worm 7. Adjacent the upper portion of the frame and preferably opposite the shaft 3 is another shaft 8 having a pulley 9 thereon around which and the pulley 6 a belt 10 passes whereby this second shaft 8 may be turned, this shaft being further provided with a suitable pulley 11 for operating the wheels which dress the teeth of the saw, there being another pulley 12 also mounted on this shaft around which the belt 13 passes, this belt being used for conveying power to a suitable grinding wheel 14. The wheel 14 is mounted on a suitable shaft 15 carried in bearings 16, the bearings being supported on a movable frame which may be denoted as a whole by 17, this frame being slidable up and down on fixed uprights 44, in a manner to be hereinafter described.

Extending transversely of the frame members 1 is an inner shaft 19 mounted in suitable bearings 20, one end of the shaft being provided with a worm gear 21 meshing with the before-mentioned worm 7 on the end of the shaft 3, this shaft 3 serving as a main power shaft, the turning thereof being communicated to the shafts 15, 8 and 19 by the means mentioned. The shaft 19 is provided intermediate its ends with a plurality of cams 22, 23, 24, each of which is irregular in outline the cams being provided with projecting portions 22', 23', 24'.

Extending longitudinally of the machine are a number of levers 25, 26, 27, (Fig. 1)

one of which, 25, is pivotally supported at 28 adjacent one end of the machine and the others of which, are pivotally supported at 29 adjacent the opposite end of the machine. These levers are actuated by the aforementioned cams 22, 23, 24, and in order to provide for ease of operation, each lever is preferably provided with a roller 30, 31, 32, engaging the cams whereby the friction of the parts is reduced.

Extending upwardly from the lever 25 is a rod 33 having a threaded portion 34 thereon, the lower end of this rod being provided with a bifurcated member 35 having a roller 36 between its ends engaging the lever, the threaded portion of the rod engaging in a threaded opening provided adjacent the lower end of the frame 17, the upper end of the rod being provided with a handle 37 whereby it may be turned, the rod also engaging the upper end of the frame 17; this frame 17 is made up of the horizontally extending portions 38 which carry the bearings 16, these portions being connected together by cross pieces 39, there being a downwardly and vertically extending member 40 having an offset lower end portion 41 which is provided with a suitable opening, this end being also provided with an oppositely extending boss 42 carrying the threaded opening which engages with the threaded portion 34 of the rod 33, this boss being in line with a similar boss 43 adjacent the top of this member; the previously mentioned fixed uprights 44 carried by the frame of the machine, pass through openings in the pieces 41 and other openings adjacent the top of the frame which are in line with the lower openings, the uprights being so positioned that as the handle 37 is turned the threaded engagement between the rod 33 and the frame 17 will raise and lower the frame and with it the sharpening wheel 14. As the shaft 19 turns, the cam 24 will raise and lower the rod 33 and with it the frame 17 and the sharpening wheel 14. This wheel comes into contact with each successive tooth of the circular saw, which is held by means to be presently described, and the frame 17 in the operation of the machine is fixed with respect to the rod 33 so that once the relation of these parts is determined no further adjustment is necessary unless a saw of different size is placed in the machine.

Since it is desirable in filing the saw that the speed of the sharpening wheel be at least of a certain amount I have provided an automatic regulating device which insures that the sharpening wheel will not be moved adjacent the teeth of the saw until a certain speed is reached, preferably 900 revolutions a minute, this device being constructed and arranged as follows: Secured to the outer end of the shaft 8 by any suitable means, such as a key 45 is a sleeve 46 having slots 47 in opposite sides thereof, the outer end of the sleeve containing an adjustable plug 48 having an opening therethrough, there being a rod 49 extending through this plug and into the interior of the sleeve 46; extending transversely of the sleeve and through the slots 47 therein is a pin 50 in engagement with the rod 49, the pin being held at one end of the slots when the machine is not in operation by means of a helical spring 51, one end of which engages the pin 50 and the other end of which engages in the plug 48. The outer end of the rod 49 has a block 52 secured thereto in any suitable manner, preferably by the engagement of a groove 53 on the outside of the rod, the block being made in two pieces and held together by positioning pins 54, this block engaging in the upper end of a lever 55 pivotally secured at an intermediate point 56 to one of the frame members whereby movement of the rod 49 back and forth through the medium of a pin and slot connection 57 will actuate the lever about its point of pivotal support; pivotally secured at opposite points of the sleeve 46 are levers 58, the outer end of each containing a weight or ball 59 of suitable mass, the balls being connected to the transversely extending pin 50 in the sleeve by means of links 60, the idea being that as the shaft 8 rotates the balls 59 will be thrown outwardly by centrifugal force, thereby moving the rod 49 within the sleeve 46 and moving the lever 55 about its support.

Figure 4:
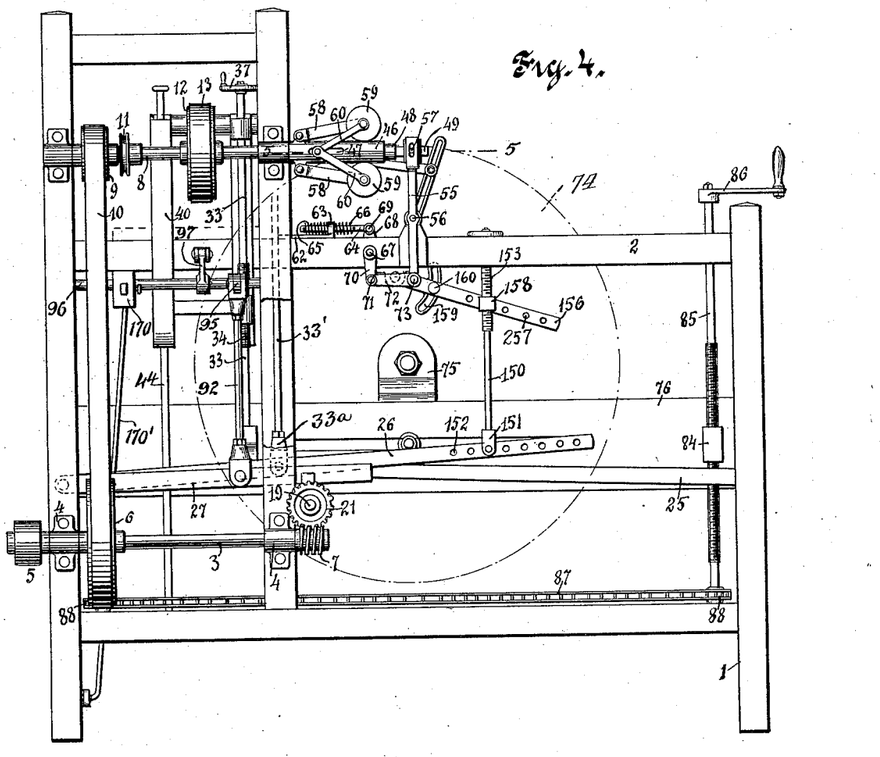
Fig. 4 is a side view of the machine as illustrated in Fig. 1.
Figure 5:
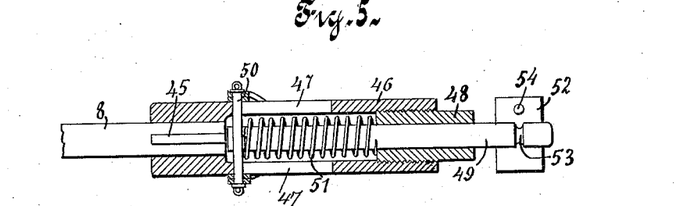
Fig. 5 is a sectional view on the line 5—5 of Fig. 4.

Pivotally secured to the lever 25 (Fig. 2) and at a suitable distance from the rod 33 is another rod 33′ preferably provided with a bifurcated end portion 33ª whereby it may be secured to the lever 25, one side of this rod adjacent its upper end being provided with a recess 61 (see Fig. 9) there being a slidable element 62 (Fig. 4) supported by the frame of the machine adjacent this rod 33′, one end of the element being positioned within the said recess; one end of this element 62 is provided with an upstanding portion 63 through which a rod 64 extends, the element being movably fixed with relation to the rod through the medium of helical springs 65, 66, carried by the rod, one end of each spring engaging the end portion 63 so that while the element 62 is actuated by the rod 64 the movement is a resilient one because of these springs 65, 66; extending transversely of the machine is a shaft 67 (Fig. 1) having a short lever 68 secured thereto intermediate its ends, the upper end of this lever being in pivotal engagement at 69 with one end of the before-mentioned rod 64 so that turning of the shaft 67 in either direction will actuate the slidable element 62, thereby moving it into or out of position within the recess 61 in the side of the rod 33′; the outer end of this shaft 67 is provided with a lever 70 (Fig. 4), the lower end of which is in pivotal engagement, as at 71, with a link 72, the other end of this link being in pivotal engagement at 73 with the lower end of the before mentioned lever 55 which is in engagement at its upper end with the rod 49 actuated by the centrifugal device. Thus it will be seen that in the operation of the machine the centrifugal device will not move the slidable element 62 out of the recess 61 in the rod 33′ until a certain speed is reached so that, while the sharpening wheel 14 may be rotating in the frame 17 which supports it, it is held against movement on the uprights 44 until this predetermined speed is reached, because of the engagement of the end of the element 62 with the rod 33′ in the recess therein, this rod being permitted a slight up and down movement because of the length of the recess 61; the lever 25 which actuates both rods 33 and 33′ through the engagement of the cam 24′ therewith moves up and down a distance equal to the length of the recess 61 when the sliding element 62 is positioned therein. Of course after the speed of the machine reaches 900 revolutions per minute the element 62 moves out of the recess 61 and the rods 33 and 33′ can then move up and down a distance equal to the height of the cam 24′ which distance is sufficient to carry the sharpening wheel 14 adjacent the saw and into engagement with any one of the teeth.

Figure 3:
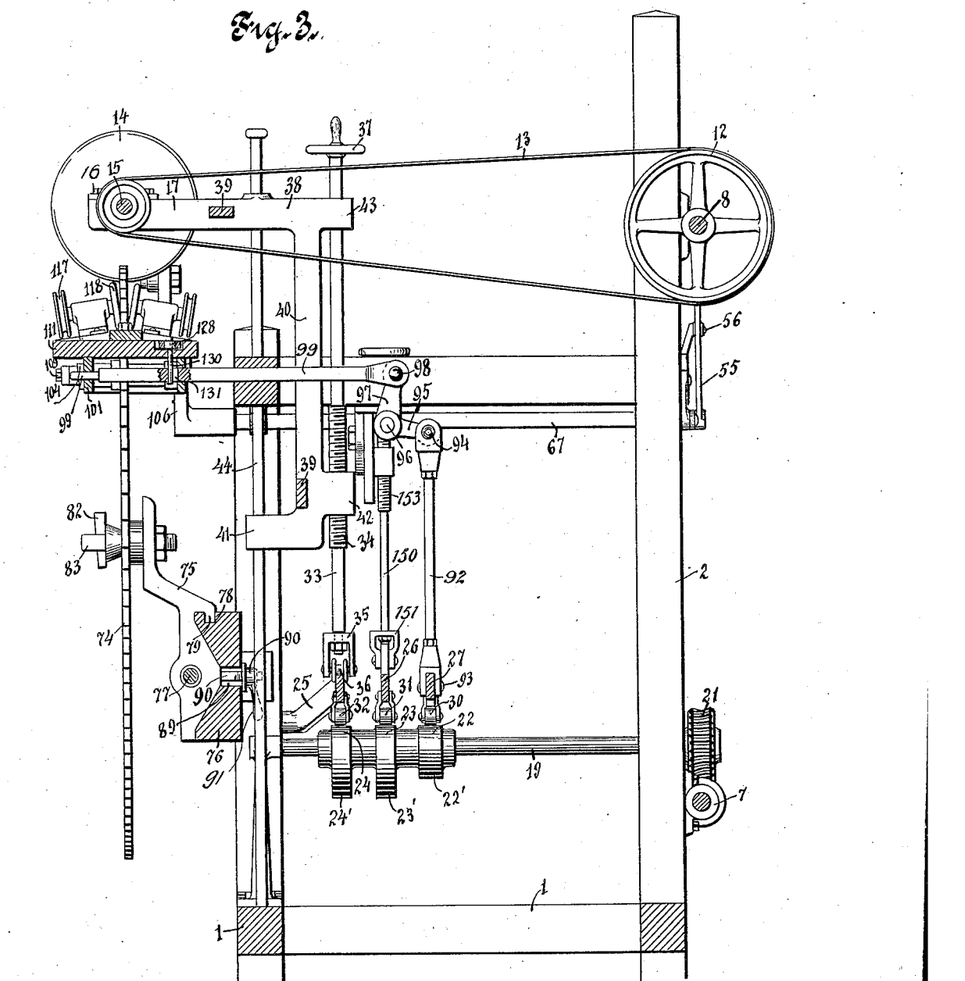
Fig. 3 is a vertical sectional view thereof along the line 3—3 of Fig. 1.

The circular saw 74 is suitably mounted in a carriage 75 which moves back and forth on a supporting member 76, there being a longitudinally extending threaded shaft 77 engaging the carriage 75 by means of a threaded opening therein; the supporting member 76 is provided on its upper side with a slot 78, the carriage 75 being provided with an offset portion 79 engaging in the slot so that the carriage is guided in its movement along the supporting member. The threaded shaft 77 is suitably supported in bearings 80 at opposite ends of the supporting member 76, one end of the shaft being squared as at 81 or provided with any other suitable means whereby it may be turned in order to move the carriage 75 along the supporting member; the saw 74 may be supported in any desirable or suitable manner on the carriage, the preferred device being a clamping means, such as a wedge 82 engaging a transversely extending bolt 83. The supporting member 76 is movable up and down in order to adjust saws of different diameters to the grinding wheel and to this end it is provided with threaded blocks 84 through which threaded shafts 85 extend, the upper end of one of the shafts being provided with a suitable handle 86; in order to provide equal movement of each end of the supporting member the threaded shafts 85 being connected by means of a chain 87 which engages with suitable sprockets 88 at the lower ends of these threaded shafts. After the saw has been secured in the carriage 75 the supporting member 76 is brought to the proper height by operation of the handle 86, the threaded shaft 77 being then turned to move the carriage along the supporting member; in order to make the saw and the carriage rigid on the frame the supporting member may be provided for a portion of its length with a suitable longitudinally extending slot 89, in order to receive a threaded extension member 90 extending rearwardly of the carriage 75, (see Fig. 3) the outer end of this threaded member having a suitable clamping handle 91 thereon whereby the position of the carriage may be fixed by tightening this handle. The saw 74, although firmly held on the carriage 75, is yet rotatable thereon in order to permit the successive teeth to be brought adjacent the sharpening wheel 14; other means adjacent the top of the saw are provided to clamp it while any particular tooth is being gummed or filed, such means being automatic in operation and acting periodically. A vertically extending link 92 is pivotally secured adjacent its lower end at 93 to one of the longitudinally extending levers 27, (Fig. 3), the upper end of this link being in pivotal engagement at 94 with a lever 95 mounted on a longitudinally extending shaft 96; also carried by the shaft 96 and extending preferably in a direction at 90° to the direction of the lever 95 is another lever 97 which is pivotally engaged at 98 with one end of a link 99 which is adapted to actuate the vise or clamping means for the saw and also regulate the movement of the dressing wheels.

Figure 6:
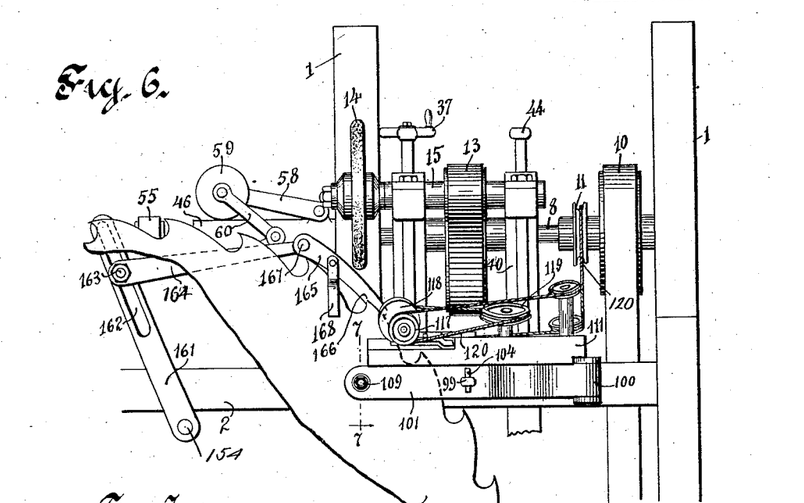
Fig. 6 is a front side view of a portion of the machine showing the means for dressing each tooth after filing and the means for rotating the saw.
Figure 7:
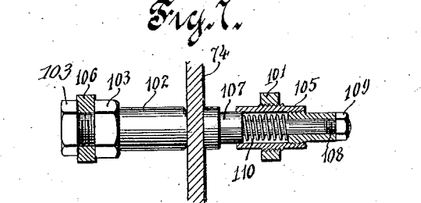
Fig. 7 is a vertical sectional view along the line 7—7 of Fig. 6.

Referring particularly to Figs. 2, 6 and 7 it will be noted that adjacent the top of the machine and secured thereto in any desirable manner is a support 106, the outer end of which is provided on one side with a lug 102, this lug being secured in position by any suitable means such as nuts 103, the lug being adapted to engage one side of the circular saw 74; the opposite side of the saw 74 is periodically engaged by a suitable resilient co-acting plug, the construction of which is shown in Fig. 7, there being a sleeve 105 secured adjacent the outer end of the lever 101 which is pivotally supported at 100 to the machine frame; the outer end of this sleeve receives one end of a plug 107 having a reduced and threaded opposite end 108 secured in position within the sleeve by any means, such as a nut 109; the plug is retained in position as shown in Fig. 7 through the medium of a helical spring 110 positioned within the sleeve. As the shaft 19 (see Fig. 3) revolves, the cam surface 22′ thereon will actuate the link 92 which in turn will oscillate the shaft 96 through the medium of the lever 95, the link 99 being in turn reciprocated through the medium of the lever 97 which is secured to the shaft 96, the movements of the link 99 carrying the outer end of the lever 101 (see Fig. 6) into and out of engagement with the saw 74, thereby alternately clamping it for grinding by the sharpening wheel 14 and releasing it in order to be advanced by means to be subsequently described. Thus it will be noted that the saw 74 is firmly yet resiliently held between the opposite plugs 102, 107 while the sharpening wheel 14 is operating on any tooth.

Figure 8:
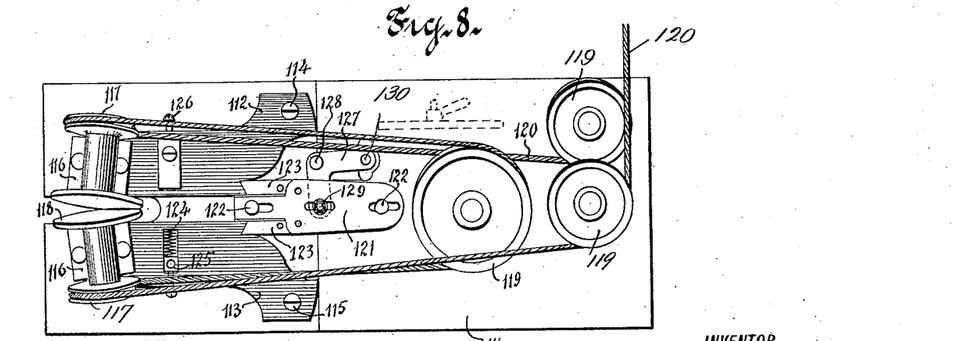
Fig. 8 is a top plan view of the dressing wheels showing the adjustable mounting thereof.

In order to dress the sides of each tooth after it has been gummed and filed I make use of suitable dressing wheels, shown particularly in Figs. 6 and 8. A suitable table or other supporting device 111 is secured to the upper end of the frame of the machine, there being a pair of arms 112, 113, pivotally secured at 114, 115 to this table or support, the outer ends of the arms being provided with suitable bearings 116 within which shafts are carried, the outer end of each shaft being provided with a suitable pulley 117 and the adjacent ends of these shafts being provided with dressing wheels 118 arranged as shown in Fig. 8 so that they may engage the opposite edge portions of any tooth in order to dress the same after it has been filed. The support or table is also provided with suitable pulleys 119 around which a rope or wire belt 120 passes, the pulleys being provided in order to change the direction of motion, this belt or pulley passing around and engaging the small pulley 11 mounted on the shaft 8 at the opposite side of the machine. These wheels 118 are designed to act simultaneously with the sharpening operation of the saw by the wheel 14 and in order to hold the sharpening wheel in engagement with any tooth and to have the saw itself clamped at that instant, the wheels 118 also being in operative position, I have arranged the cam surfaces 22′, 24′, in position on the shaft 19 so that when the link 99 moves outwardly and releases the clamping lever 101 the filing wheel 14 is brought into elevated position. Referring particularly to Fig. 8 it will be noted that adjacent the pivoted ends of the arms 112, 113, and positioned between them is a longitudinally slidable element 121 movable on the table or support 111 by means of pin and slot connections 122, the opposite sides of this element 121 being provided with pivoted members 123, which engage the arms 112, 113, so that if the element 121 is moved longitudinally of the table or support the arms 112, 113 will be moved apart, thereby moving the dressing wheels 118 remote from each other; these wheels, however, are retained in the position shown in Fig. 8 through the medium of springs 124 positioned within openings in the arms, one end of one spring being in engagement with an upright 125 secured to the table or support, each arm being adjustable through the medium of a set screw 126.

In order to move the element 121 along the table or support 111 I make use of a bell crank lever 127 pivotally secured at 128 to the table, one end of the lever being in engagement with the element 121 as at 129, the other end of this lever being provided with a downwardly extending pin 130, this pin engaging in a suitable opening or recess 131, (see Fig. 3) in the link 99 so that when the link moves to the left to release the clamping lever 101 it will engage the pin 130, thereby moving the bell crank 137 and moving the arms 112, 113 away from each other and providing for the advancement of the saw between the dressing wheels 118.

In order to rotate the saw at the proper times whereby each successive tooth is brought into position with respect to the sharpening wheels and the dressing wheels I have provided suitable means which will be now described; extending vertically of the machine and positioned between the rod 33 and the link 92 is a third rod 150, the lower end of which may be provided with a swivel connection 151 engaging in any one of a desirable number of openings 152 adjacent the outer end of the lever 26, which lever is actuated by the cam surface 23′ on the shaft 19, the upper end of this rod being threaded, as at 153; extending transversely of the machine and adjacent the top is a shaft 154 having a pair of arms 155, 156, carried thereby, one of the arms 155 being adapted to be securely positioned on the shaft by any means, such as a set screw 157, the other arm 156 being provided adjacent its outer end with any number of suitable openings 257 in any one of which a threaded block 158 is adapted to be engaged, this threaded block engaging the threaded end 153 of the rod 150, previously mentioned. The position of the arm 156 with respect to the lever 26 can be varied by means of the openings 152, 257, and also by turning the rod 150 in order to move the levers relatively to each other; the shaft 154 is adapted to be oscillated by means of the arm 155 and in order that the movement of the arm 156, which is freely supported on the shaft 154, may be communicated thereto; the free end of the arm 155 is provided with an arcuate slot 159 through which passes a suitable bolt 160 engaging the arm 156 whereby tightening of the bolt will fix the relation between the arms 155 and 156. One end of the shaft 154 is provided with an arm 161, the outer end of which is provided with a slot 162 into which a bolt 163 extends, the bolt being positioned at the outer end of a link 164 mounted adjacent the saw 74 and provided at its other end with a dog 165 having a notch 166 adjacent its free end adapted to engage the point of one of the teeth on the saw, the dog being movable about its support 167 and being provided with a downwardly extending bifurcated member 168, the arms of which extend on opposite sides of the saw 74, the purpose of these arms being to maintain the proper position of the dog with respect to the saw. As the lever 26 is moved up and down by reason of its engagement with the cam surface 23' the shaft 154 will be oscillated and the link 164 carrying the dog 165 will successively move back and forth, coming into engagement with a succeeding tooth on the saw and then turning the saw and bringing the said tooth into proper position to be engaged by the sharpening wheel 14.

It is to be noted in passing that in the operation of the clamping lever 101 it is desirable that the pressure be maintained against the saw, the operation of the machine moving the lever in order to carry it out of engagement with the saw, this pressure being provided by means of a long arm 169 secured to the shaft 96, there being a weight 170 at the outer end thereof of sufficient mass and secured thereto by means of a set screw 171; in some instances it may be desirable to release the clamping jaw 101 without starting the machine, and to provide for this I have extended the lever 169 to the opposite side of the shaft 96 whereby a shorter arm 169' is provided to which a link 171' is attached, the lower end of the link being pivotally secured at 272 to a foot plate 172 pivotally supported at 173 to the frame of the machine.

While the operation of most of the parts has been set forth in describing the structure of the machine, the use and operation thereof may be summed up as follows: The saw 74 is suitably positioned in the carriage 75; power is applied to the shaft 8 whereby the sharpening wheel 14 is rotated, the wheel coming into and out of engagement with each successive tooth of the saw after the proper speed has been reached, the relation of the cams 22, 23, 24, with respect to each other being such that when the sharpening wheel is lowered the clamping means holds the saw rigidly in position and the dog 165 is out of the path of this sharpening wheel; the carriage 17 and the sharpening wheel 14 are then brought into raised position, at which instant the clamping device or lever 101 is released and the dog 165 moves to bring the next tooth into line with the wheel; it is to be particularly noted that when the clamping lever 101 is in operative position the dressing wheels 118 are closely adjacent and are finishing the sides of the tooth which has been previously ground. The relative positions of the cams 22, 23, and 24 on the shaft 19 may be varied in order to make the travel of the sharpening wheel 14 more or less and to provide for various angles of advancement of the saw, depending on the character of the teeth thereon, such changes being within the scope of my invention and adapting the machine to gumming and filing different circular saws.

Having thus described my invention, I claim as new, and desire to secure by Letters Patent:—

1. A machine of the class described comprising means for holding a saw in position, grinding means embodying a movable frame having a movable abrasive member therein, means for moving the frame and member into and out of engagement with the teeth on the saw at or above a certain speed, and means for moving the saw in order to bring the teeth successively into position for grinding.

2. A machine of the class described comprising a frame having means thereon for holding a saw in position, a movable frame having a device therein for grinding the teeth on the saw, means whereby the said device may be operated, means for moving the frame and the device adjacent the teeth on the saw at or above a certain speed, and means for bringing the teeth on the saw successively into position to be ground.

3. A machine of the class described comprising a suitable frame having movable means thereon for supporting a saw, another frame having a grinding wheel thereon, means whereby the frame and grinding wheel may be brought adjacent the teeth on the saw, and means permitting such movement only at or above a certain speed.

4. A machine of the class described comprising a frame having a carriage thereon for supporting a saw, a frame having a sharpening wheel thereon adapted to engage the teeth on the saw, means for operating the grinding wheel, and other means whereby the grinding wheel may engage the teeth at or above a certain speed.

5. In a machine of the class described, a suitable frame, a shaft carried by the frame, a plurality of cams on the shaft, means for holding a saw in position on the frame, a sharpening device movably mounted on the frame, means actuated by one of the cams for raising and lowering the sharpening device, other means actuated by the same cam whereby the said raising and lowering occurs only at or above a certain speed, and means actuated by the other cam for successively bringing the teeth of the saw into sharpening position.

6. A machine of the class described comprising a suitable frame, means for holding a saw in position thereon, a sharpening device movably mounted on fixed members, a shaft carried by the frame, cams actuated by the shaft, means actuated by one of the cams for moving the sharpening device on the uprights, other means actuated by another cam for bringing the teeth on the saw successively into sharpening position, and other means actuated by a third cam for clamping the saw while any tooth is being ground.

7. A machine of the class described comprising a frame, a shaft mounted on the frame, cams on the shaft, means for rotatably holding a circular saw in position on the frame, a second frame having a sharpening device revolubly mounted therein, the second frame being movable relatively to the first frame, means for driving the sharpening device, a plurality of levers pivotally supported on the first frame, a rod in engagement with one of the levers and in operative relation with the said second frame whereby the frame and the sharpening device may be moved into and out of engagement with successive teeth, a rod connected to the second lever and in operative engagement with a clamping device whereby the saw is held in position while any tooth is being sharpened, and means connected to the third lever and embodying a dog for engagement with the teeth on the saw whereby the saw is turned and each tooth is brought into position for engagement with the sharpening device.

8. A machine of the class described comprising a suitable frame, a shaft mounted thereon, the shaft having a plurality of cams thereon, means for turning the shaft, means on the frame for rotatably supporting a circular saw in position, means whereby the position of the saw on the frame may be varied, uprights carried by the frame, a second frame carrying a sharpening device movable on the said uprights, means for driving the sharpening device, together with a plurality of levers carried by the first frame, each lever being in engagement with one of the cams, means actuated by the movement of one of the levers for raising and lowering the second frame on the uprights, means actuated by the second lever for clamping the saw when any tooth is being sharpened, and other means actuated by the third lever for engagement with the teeth on the saw whereby the saw is turned and each tooth is successively brought into position for engagement with the sharpening device.

9. A machine of the class described comprising a frame, a shaft mounted in the frame, a plurality of cams carried by the shaft, means for turning the shaft, adjustable means for rotatably holding a circular saw in position on the frame, uprights carried by the frame, a second frame movably mounted on the uprights, a sharpening wheel carried by the second frame, means for driving the sharpening wheel, a plurality of levers in engagement with the said cams and rods in engagement with the levers, one of the rods actuating the second frame whereby the sharpening wheel is moved relatively to the first frame, other means actuated by the second rod whereby the saw is clamped in position as any tooth is being sharpened, and means actuated by the third rod, the said means embodying a dog for engagement with the teeth on the saw whereby the successive teeth are brought into position for engagement with the sharpening wheel.

10. A machine of the class described comprising a frame, a shaft on the frame, cams on the shaft, levers actuated by the cams, means for holding a saw in position on the frame, a grinding device movably supported on the frame, means actuated by one of the cams for raising and lowering the grinding device into and out of engagement with succeeding teeth on the saw, a lever pivotally supported at one end of the machine, the free end of the lever being provided with a resilient plug, the lever extending on one side of the saw, a lug carried by the machine on the opposite side of the saw, and means actuated by the other of the said levers toward and away from the saw, whereby the saw may be clamped when a tooth is being filed and unclamped when the next succeeding tooth is brought into grinding position.

11. A machine of the class described comprising a suitable frame, a shaft mounted in the frame, cams on the shaft, a plurality of levers pivotally supported by the frame, and actuated by the cams, means for holding a saw on the frame, a grinding device movable relatively to the saw, means actuated by one of the levers for actuating the grinding device, a clamping device embodying a pivoted lever adapted to engage one side of the saw, one end of the lever having a resilient plug thereon, and means actuated by the other of the first-mentioned levers for moving the plug toward and away from the saw whereby it is held rigidly in position while the tooth is being ground.

12. In a machine of the class described, a suitable frame, a grinding device movably mounted on the frame and adapted to come into and out of engagement with the teeth of a saw, means for actuating the grinding device, means for moving the grinding device, and other means embodying a rod and a slidable element adapted to engage the rod below a certain speed whereby movement of the grinding device into engagement with the saw is prevented.

13. In a machine of the class described, a suitable frame, a sharpening device movably mounted on the frame, means for actuating the said device, means for moving the said device relatively to the frame, and other means embodying a reciprocating rod having a recess in one side thereof, and a slidable element movable into and out of engagement in the said recess, a centrifugal device for moving the said slidable element whereby the movement of the sharpening device on the frame into engagement with the saw is prevented save at or above a certain speed.

14. In a machine of the class described, a suitable frame, means for holding a saw thereon, a grinding device movably mounted on the frame and adapted to come into and out of engagement with the teeth on the saw, means for actuating the said device, means for moving the said device relatively to the saw, and other means embodying a reciprocating rod having a recess in one side thereof, a slidable element engaging in the said recess, whereby reciprocation of this rod is prevented, and means embodying a centrifugal device in operative engagement with the slidable element whereby when the speed exceeds a certain amount, the slidable element moves out of the said recess, thereby permitting the grinding device to engage the saw.

15. A machine of the class described comprising a frame, a saw mounted on the frame, a grinding device movably mounted on the frame and adapted to come into and out of engagement with the teeth on the saw, means for actuating the said device, means for moving it relatively to the saw, and other means embodying a reciprocating rod having a recess in one side thereof, a slidable element normally seated in the said recess, together with a centrifugal device engaging the said slidable element through the medium of a lever and a link whereby when the speed exceeds a certain amount the slidable element will move out of the recess and permit the grinding device to come into engagement with the saw.

16. In a machine of the class described comprising a suitable frame, means on the frame for revolubly supporting a saw, a second frame movably mounted on the first, a grinding device carried by the second frame, means for actuating the said device, other means for reciprocating the second frame on the first whereby the said device moves into and out of engagement with the successive teeth on the saw, a reciprocating rod operatively connected to the reciprocating means for the second frame, a recess in the side of the rod, a slidable element engaging in the recess, a centrifugal device actuated by the means for actuating the grinding device, the said centrifugal device embodying levers having balls at the ends thereof and a slidable rod operatively connected to the balls, the said rod actuating the said slidable element through the medium of a lever and a link whereby as the speed increases the centrifugal device will move the slidable element out of the recess, thereby permitting the grinding device to come into and out of engagement with the teeth on the saw.

17. The combination of clamping means for a saw embodying relatively movable plugs for engagement with opposite sides of the saw, means for periodically moving one of the plugs relatively to the other out of engagement with the saw, and means for periodically turning the saw in order to bring the teeth thereon into successive position for grinding, the saw-turning means operating alternately the clamping means.

18. In combination with grinding means for a saw, clamping means adapted to engage opposite sides of the saw to hold the same in position for grinding, means in which the saw is rotatably mounted, means for periodically bringing the clamping means out of engagement with the saw, and other means for turning the saw in order to bring the teeth successively into position for grinding, the clamping means and the saw-moving means operating alternately.

In testimony whereof I have signed my name to this specification in the presence of two subscribing witnesses.

ABRAHAM L. KIRKWOOD.

Witnesses:
D. R. Vaught,
J. T. Horn.